US007306306B2

(12) United States Patent
Katsu et al.

(10) Patent No.: US 7,306,306 B2
(45) Date of Patent: Dec. 11, 2007

(54) INKJET RECORDING METHOD AND INKJET RECORDING APPARATUS

(75) Inventors: Takuji Katsu, Tokyo (JP); Norihiro Kawatoko, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 11/007,550

(22) Filed: Dec. 8, 2004

(65) Prior Publication Data

US 2005/0190213 A1 Sep. 1, 2005

(30) Foreign Application Priority Data

Dec. 9, 2003 (JP) ............................ 2003-410768

(51) Int. Cl.
*B41J 29/38* (2006.01)
*G06K 15/02* (2006.01)

(52) U.S. Cl. ................................ 347/5; 347/9; 358/1.2

(58) Field of Classification Search .................... 347/5, 347/9, 14, 15, 19, 20, 10, 11, 12; 358/1.2, 358/502

See application file for complete search history.

(56) References Cited

U.S. PATENT DOCUMENTS

2003/0210288 A1* 11/2003 Murata .......................... 347/5
2004/0233246 A1* 11/2004 Takeushi ..................... 347/19

FOREIGN PATENT DOCUMENTS

JP 11212318 A * 8/1999
JP 2000-071433 A 3/2000
JP 2001-129985 A 5/2001

* cited by examiner

*Primary Examiner*—Lamson Nguyen
*Assistant Examiner*—Lisa M Solomon
(74) *Attorney, Agent, or Firm*—Canon U.S.A. Inc I.P. Div

(57) ABSTRACT

An inkjet recording apparatus in which displacements of dots are reduced. In the inkjet recording apparatus, recording data is read out from a recording buffer at a period corresponding to a second resolution. The apparatus determines whether or not to delay the timing at which the readout is performed by an interval corresponding to one-half of the period corresponding to a first resolution. The apparatus also selects whether to drive an inkjet head in a front half or a last half of the period corresponding to the first resolution.

6 Claims, 13 Drawing Sheets

BK NOZZLES

COLOR NOZZLES

FIG. 3A

| BK_DATA(EVEN) | | CORRESPONDING NOZZLES |
|---|---|---|
| NZL_D[ 9: 0 ] | BE0 | {288, 256, 224, 192, 160, 128, 96, 64, 32, 0} |
| NZL_D[ 19: 10 ] | BE1 | {290, 258, 226, 194, 162, 130, 98, 66, 34, 2} |
| NZL_D[ 29: 20 ] | BE2 | {292, 260, 228, 196, 164, 132, 100, 68, 36, 4} |
| NZL_D[ 39: 30 ] | BE3 | {294, 262, 230, 198, 166, 134, 102, 70, 38, 6} |
| NZL_D[ 49: 40 ] | BE4 | {296, 264, 232, 200, 168, 136, 104, 72, 40, 8} |
| NZL_D[ 59: 50 ] | BE5 | {298, 266, 234, 202, 170, 138, 106, 74, 42, 10} |
| NZL_D[ 69: 60 ] | BE6 | {300, 268, 236, 204, 172, 140, 108, 76, 44, 12} |
| NZL_D[ 79: 70 ] | BE7 | {302, 270, 238, 206, 174, 142, 110, 78, 46, 14} |
| NZL_D[ 89: 80 ] | BE8 | {304, 272, 240, 208, 176, 144, 112, 80, 48, 16} |
| NZL_D[ 99: 90 ] | BE9 | {306, 274, 242, 210, 178, 146, 114, 82, 50, 18} |
| NZL_D[109:100 ] | BE10 | {308, 276, 244, 212, 180, 148, 116, 84, 52, 20} |
| NZL_D[119:110 ] | BE11 | {310, 278, 246, 214, 182, 150, 118, 86, 54, 22} |
| NZL_D[129:120 ] | BE12 | {312, 280, 248, 216, 184, 152, 120, 88, 56, 24} |
| NZL_D[139:130 ] | BE13 | {314, 282, 250, 218, 186, 154, 122, 90, 58, 26} |
| NZL_D[149:140 ] | BE14 | {316, 284, 252, 220, 188, 156, 124, 92, 60, 28} |
| NZL_D[159:150 ] | BE15 | {318, 286, 254, 222, 190, 158, 126, 94, 62, 30} |

FIG. 3B

| COLOR_DATA(EVEN) | | CORRESPONDING NOZZLES |
|---|---|---|
| NZL_D[ 3: 0 ] | BE0 | { 96, 64, 32, 0} |
| NZL_D[ 13: 10 ] | BE1 | { 98, 66, 34, 2} |
| NZL_D[ 23: 12 ] | BE2 | {100, 68, 36, 4} |
| NZL_D[ 33: 30 ] | BE3 | {102, 70, 38, 6} |
| NZL_D[ 43: 40 ] | BE4 | {104, 72, 40, 8} |
| NZL_D[ 53: 50 ] | BE5 | {106, 74, 42, 10} |
| NZL_D[ 63: 60 ] | BE6 | {108, 76, 44, 12} |
| NZL_D[ 73: 70 ] | BE7 | {110, 78, 46, 14} |
| NZL_D[ 83: 80 ] | BE8 | {112, 80, 48, 16} |
| NZL_D[ 93: 90 ] | BE9 | {114, 82, 50, 18} |
| NZL_D[103:100 ] | BE10 | {116, 84, 52, 20} |
| NZL_D[113:110 ] | BE11 | {118, 86, 54, 22} |
| NZL_D[123:120 ] | BE12 | {120, 88, 56, 24} |
| NZL_D[133:130 ] | BE13 | {122, 90, 58, 26} |
| NZL_D[143:140 ] | BE14 | {124, 92, 60, 28} |
| NZL_D[153:150 ] | BE15 | {126, 94, 62, 30} |

FIG. 12

ADDRESS: B000    NAME OF REGISTER: DOUBLE    NAME OF BLOCK: NDL_DG

[FUNCTION] COLOR FOR DOUBLE MODE (READING AT PERIOD OF TWO COLUMNS)

| 15 | | | | 11 | | | | 7 | | | | 3 | | | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 3 | 3 | 3 | 3 |

0: NOT USED 1: READ ONLY 2: WRITE ONLY 3: W/R

| BIT | MEAN OF BIT | FUNCTION | W/R | AT RESET |
|---|---|---|---|---|
| 0 | BK_DOUBLE | WHETHER TO EXECUTE DOUBLE MODE FOR BK 0: NORMAL, 1: DOUBLE MODE | W/R | 0 |
| 1 | CYAN_DOUBLE | WHETHER TO EXECUTE DOUBLE MODE FOR CYAN 0: NORMAL, 1: DOUBLE MODE | W/R | 0 |
| 2 | MAGENTA_DOUBLE | WHETHER TO EXECUTE DOUBLE MODE FOR MAGENTA 0: NORMAL, 1: DOUBLE MODE | W/R | 0 |
| 3 | YELLOW_DOUBLE | WHETHER TO EXECUTE DOUBLE MODE FOR YELLOW 0: NORMAL, 1: DOUBLE MODE | W/R | 0 |

FIG. 13

ADDRESS: B000 | NAME OF REGISTER: DTRANS_LDX(40) | NAME OF BLOCK: HEAD_TOP

[FUNCTION] DISCHARGE CONTROL AT 1200 dpi INTERVAL FOR 600 dpi DATA (COLOR: FINE)

| 15 | | | | 11 | | | | 7 | | | | 3 | | | 0 |
|---|---|---|---|---|---|---|---|---|---|---|---|---|---|---|---|
| 0 | 0 | 0 | 0 | 0 | 0 | 0 | 0 | 0 | 3 | 3 | 3 | 3 | 3 | 3 | 3 |

0: NOT USED 1:READ ONLY 2: WRITE ONLY 3: W/R

| BIT | FUNCTION | | | W/R | AT RESET |
|---|---|---|---|---|---|
| 0 | 1200-dpi DISCHARGE POSITION FOR C1 | 0: 1200 dpi OF FRONT HALF | 1: 1200 dpi OF LAST HALF | W | 0 |
| 1 | 1200-dpi DISCHARGE POSITION FOR M1 | 0: 1200 dpi OF FRONT HALF | 1: 1200 dpi OF LAST HALF | W | 0 |
| 2 | 1200-dpi DISCHARGE POSITION FOR Y1 | 0: 1200 dpi OF FRONT HALF | 1: 1200 dpi OF LAST HALF | W | 0 |
| 3 | 1200-dpi DISCHARGE POSITION FOR Y2 | 0: 1200 dpi OF FRONT HALF | 1: 1200 dpi OF LAST HALF | W | 0 |
| 4 | 1200-dpi DISCHARGE POSITION FOR M2 | 0: 1200 dpi OF FRONT HALF | 1: 1200 dpi OF LAST HALF | W | 0 |
| 5 | 1200-dpi DISCHARGE POSITION FOR C2 | 0: 1200 dpi OF FRONT HALF | 1: 1200 dpi OF LAST HALF | W | 0 |
| 6 | DISABLE/ENABLE OF THIS FUNCTION | 0: DISABLE | 1: ENABLE | W | 0 |

INKJET RECORDING METHOD AND INKJET RECORDING APPARATUS

BACKGROUND OF THE INVENTION

1. Field of the Invention

The present invention relates to print-head drive control techniques for inkjet printers, and more specifically to a technique for reducing variation in discharge position between blocks caused in time-division driving of a print head and increasing the accuracy of registration adjustment.

2. Description of the Related Art

Recently, technologies of recording apparatuses have been considerably advanced in accordance with the development of personal computers. The recording apparatuses are structured to record an image on a sheet of paper on the basis of image information. In such a recording apparatus, a recording method that has recently been attracting attention most is an inkjet recording method in which recording is performed by discharging ink toward a sheet of paper from a print head. The inkjet recording method is advantageous in that high definition images are recorded at a high speed, and is superior to other recording methods in various points such as running cost and quietness.

On the other hand, registration adjustment is necessary for high-quality printing. With regard to methods for correcting displacements between landing points of ink drops discharged from nozzles of different colors or displacements between landing points of ink drops discharged from nozzles of the same color while scanning in opposite directions in the case of bidirectional printing, various techniques are known and are incorporated in many products.

In a typical print head that has recently been used, nozzles are arranged in a staggered pattern, as shown in FIGS. 2A and 2B. The figures show examples in which 320 black (BK) nozzles and 64 COLOR nozzles (for each color) are provided. In FIG. 2A, the BK nozzles are arranged in two lines: an EVEN nozzle line including 160 nozzles with even numbers on the left and an ODD nozzle line including 160 nozzles with odd numbers on the right. The nozzles of the same color are arranged in two lines with a predetermined pitch py in the y direction, and the two lines are separated from each other by a distance px corresponding to a predetermined number of pixels. The nozzles in the two lines are shifted from each other by a distance corresponding to (py/2) in the y direction. According to this arrangement, the print resolution of a single line can be doubled by adjusting the discharge timing of the two nozzle lines.

In such a case, it is necessary to correct differences in landing points of ink drops of the same color between rasters and differences in discharge direction between the EVEN and ODD nozzle lines. These differences are not only caused due to individual differences in the manufacturing process but are also influenced by the ink composition, the history such as discharge frequency, the environment in which recording is performed, etc. Accordingly, even when discharge timing of a certain head is set such that no difference in the landing points occurs under a predetermined condition, it does not mean that this setting can be applied to every case. More specifically, variations caused in the manufacturing process of the head are, of course, adjusted before shipping, and further adjustments must be performed in accordance with the usage history, etc., as necessary. A method of registration adjustment for correcting the above-described differences is suggested in Japanese Patent Laid-Open No. 2001-129985.

A typical print head is driven by a driving method in which nozzles arranged in a single line along a column direction (y direction) are divided into a plurality of nozzle groups and are driven at different timings in units of the nozzle groups. This method is described in detail in Japanese Patent Laid-Open No. 2000-071433. According to this method, i.e., time-division driving of the nozzles, the speed and stability in the ink-supplying process are increased and power consumption required for the discharge is reduced.

FIGS. 3A and 3B are tables showing the examples in which a BK nozzle line and a COLOR nozzle line, respectively, are each divided into 16 blocks. As shown in the tables, each block includes nozzles disposed at an interval of 32 nozzles. When only the EVEN nozzle line is considered, each block includes nozzles disposed at an interval of 16 nozzles. Since the nozzles separated from each other at certain intervals are classified into the same block, each nozzle is not easily influenced by the operations of the adjacent nozzles.

With regard to methods of registration adjustment, a method of shifting print data for each column by a plurality of pixels or half a pixel in units of print resolution, a method of shifting the print timing from a reference timing by a predetermined time, etc., are known. The method of shifting the print data for each column by a plurality of pixels is performed for correcting the displacements between the landing points of ink drops discharged from nozzles of different colors or roughly adjusting the displacements between landing points of ink drops discharged from nozzles of the same color while scanning in opposite directions in the case of bidirectional printing. As shown in FIG. 15, when the print resolution is 600 dpi in the scanning direction of a print head, the amount of shift can be set in units of 600 dpi. In the case of half-pixel shift, the amount of shift can be set in units of 0.5 pixels corresponding to the print resolution, that is, in units of 1200 dpi in the above-described case. In the method of shifting the print timing from the reference timing by a predetermined time, the print timing is shifted within the time period for a single column in units corresponding to a basic clock used for operating a printer system. This is performed for correcting small displacements due to the individual differences caused in the manufacturing process or the environment in which recording is performed.

However, although print start positions can be shifted by the above-described methods, the time for discharging from the blocks included in a single column in the time-division driving is constant. For example, when the print speed (carriage speed) is 40 inches/sec and the resolution is 600 dpi, the time for discharging from all of the nozzle lines in a single column is calculated as follows:

$$T\text{column}=(1/40(\text{inch/sec}))/600(\text{dpi})=41\ \mu\text{sec}$$

The discharge time for each column is typically set by reading a scaler provided along the moving direction of the carriage with an encoder on the carriage. Accordingly, the discharge time for each column is constant in a print area where the carriage speed (scan speed of the recording head) is constant. The driving time for each block in a single column is obtained by dividing the discharge time for each column by the number of blocks. For example, in the above-described case in which each column is divided into 16 blocks, the driving time for each block is calculated as follows:

$$T\text{block}=T\text{column}/16\ (\text{blocks})=2.60\ \mu\text{sec.}$$

As described above, since the time for each column and that for each block are evenly set on the basis of the reference timing, when the registration adjustment is performed, the discharge start time is shifted while the discharge time for each column is maintained constant. In the known structure, the discharge time for each column in the raster direction is determined by the print speed of the carriage and the print resolution. However, in practice, the print speed of the carriage is limited to several modes in view of the optimum values of the discharge frequency of the print head, and therefore the discharge time for each column is determined depending on the print resolution.

Recently, volumes of ink drops have been reduced to achieve high-quality printing like film photographs, and it has become possible to discharge ink drops of an extremely small volume such as 1 pl to 2 pl (picoliters). Such an extremely small ink drop forms a very small dot on a sheet of paper. Accordingly, in the time-division driving in which the discharge time differs between the blocks, there may be a case where the discharge positions of the nozzles are not aligned along a line. In conventional print heads, the volumes of ink drops are relatively large, such as 20 pl to 50 pl, and the dots formed by the ink drops overlap each other on a sheet of paper, so that the displacements between the dots in each column caused in the time-division driving are not noticeable.

In the above-described case, the time difference between the first block and the $15^{th}$ block is calculated as about 39 μsec by multiplying the time for each block by a factor of 15. Although displacements between ink drops of 2 pl cannot be noticed by human eyes, they appear as a discernible striped pattern when the displacements occur over the entire area of the image on the sheet.

SUMMARY OF THE INVENTION

The present invention is directed to an inkjet recording method and an inkjet recording apparatus which makes displacements between dots as small as possible.

In one aspect of the present invention, an inkjet recording method for moving a recording head to perform recording at a first resolution in a moving direction of the recording head, the recording head having a plurality of nozzle lines on each of which a plurality of discharge nozzles are arranged, includes a storing step of storing recording data in a recording buffer; a readout step of reading out the recording data from the recording buffer at a period corresponding to a second resolution; a readout-timing selecting step of selecting whether or not to delay a timing at which the readout step is performed by an interval corresponding to one-half of the period corresponding to the first resolution; and a drive-timing selecting step of selecting whether to drive the inkjet head in at least one of a front half and a last half of the period corresponding to the first resolution.

In another aspect of the present invention, an inkjet recording apparatus having a movable recording head configured to perform recording at a first resolution in the moving direction of the recording head, the recording head having a plurality of nozzle lines on each of which a plurality of discharge nozzles are arranged, includes: a recording buffer which stores recording data; a readout unit configured to read out the recording data from the recording buffer at a period corresponding to a second resolution; a readout-timing selecting unit configured to select whether or not to delay a timing at which the readout unit reads out by an interval corresponding to one-half of the period corresponding to the first resolution; a drive-timing selecting unit configured to select whether to drive the inkjet head in at least one of a front half and a last half of the period corresponding to the first resolution; and a setting unit configured to set the readout-timing selecting unit and the drive-timing selecting unit for each of the nozzles.

Further features and advantages of the present invention will become apparent from the following description of the embodiments with reference to the attached drawings.

BRIEF DESCRIPTION OF THE DRAWINGS

FIGS. 3A and 3B are tables showing the nozzles divided into blocks.

FIG. 12 is a diagram showing a register for generating data in a period of two columns.

FIG. 13 is a diagram showing a register for setting discharge positions.

DESCRIPTION OF THE EMBODIMENT

Figure 1:
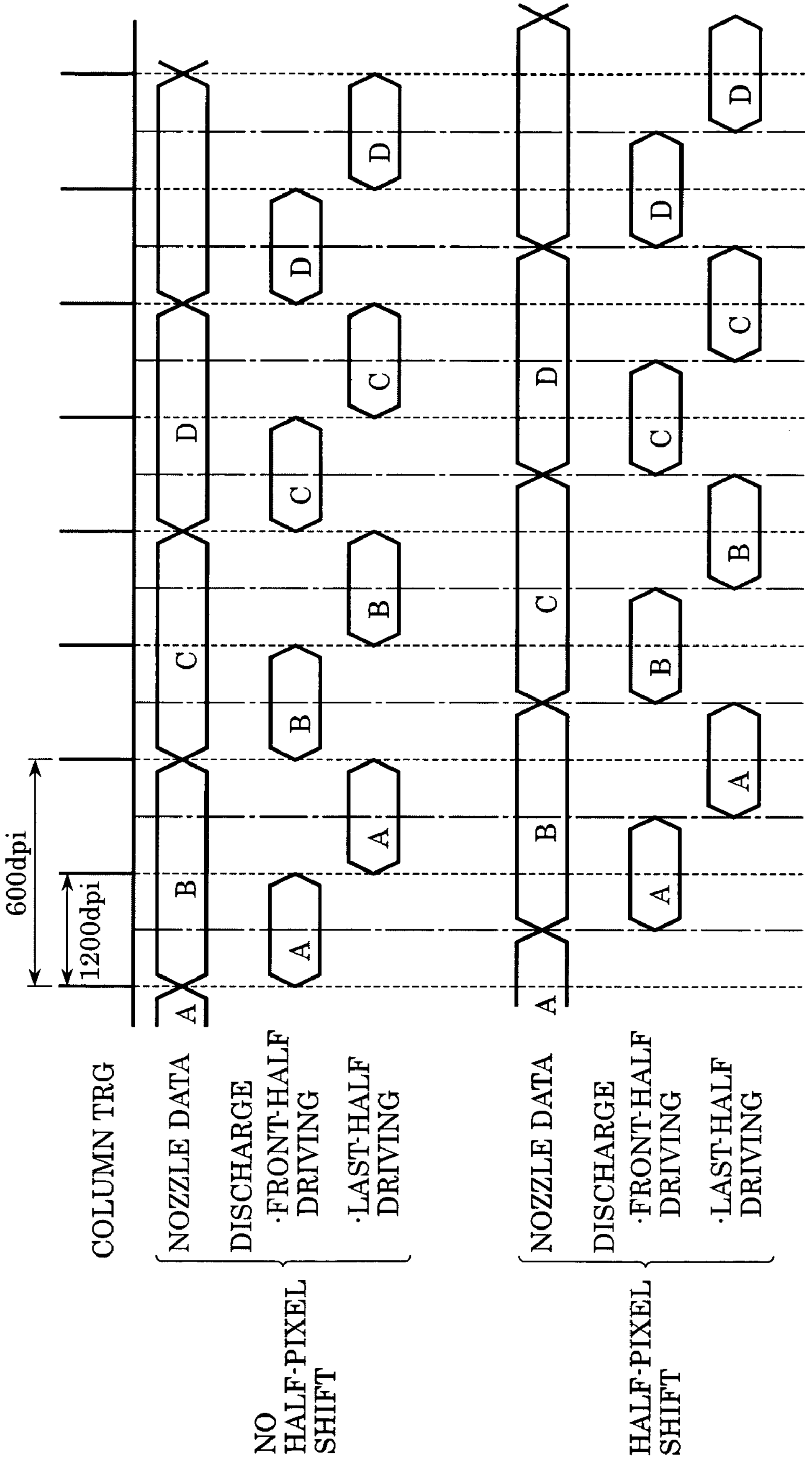
FIG. 1 is a diagram which most clearly shows a print-head driving method according to an embodiment of the present invention.

An exemplary embodiment of the present invention will be described below.

First, a summary of the embodiment will be described. In the present embodiment, an inkjet recording apparatus moves a recording head to perform recording at a first resolution in the moving direction of the recording head, the recording head having a plurality of nozzle lines on each of which a plurality of discharge nozzles are arranged. The inkjet recording apparatus includes a recording buffer which stores recording data; a readout unit configured to read out the recording data from the recording buffer at a period corresponding to a second resolution; a readout-timing selecting unit configured to select whether or not to delay the timing at which the readout is performed by an interval corresponding to one-half of the period corresponding to the first resolution; a drive-timing selecting unit configured to select whether to drive the inkjet head in a front half or a last half of the period corresponding to the first resolution; and a setting unit configured to set the readout-timing selecting unit and the drive-timing selecting unit for each of the nozzles.

Due to the above-described structure, the discharge from the print head can be performed at the time interval corresponding to a resolution twice as high as that of the image data in the print buffer. More specifically, the discharge can be performed at a time which is one-half of the time corresponding to the resolution. For example, when the resolution of the data in the print buffer is 600 dpi, the print head can be driven at the time interval of 1200 dpi, and the time for the time-division driving of all of the blocks is reduced. Therefore, even when the resolution of the print data is low, the time required for the time-division driving can be reduce to one-half of that in the known print-head driving method. In addition, the displacements of dots between the blocks in each column in the time-division driving can be reduced.

In addition, the discharge timing can be selected between the 1200 dpi in the front half of the column or that in the last half of the column, and the resolution of the registration adjustment is doubled compared to that in the known print-head driving method. In the case in which the resolution is 600 dpi, as described above, the print data can be shifted at the resolution of 1200 dpi. In addition, when the half-pixel shift is used in combination, a shift of 2400 dpi is possible and the resolution of the registration adjustment is increased.

Accordingly, the dot displacements between the blocks in a single column caused in time-division driving are reduced and the resolution of registration adjustment is increased.

The embodiment of the present invention will be described in detail below with reference to the accompanying drawings. In the embodiments described below, a recording apparatus using an inkjet recording head will be explained as an example.

In the present specification, the term “record” (also called “print”) refers not only to a process of forming significant information such as characters and figures but also to a process of forming images, designs, patterns, etc., on a recording medium or processing the medium irrespective of whether they are significant or visible to human eyes.

In addition, the term “recording medium” refers not only to paper which is commonly used in recording apparatuses but also to cloth, plastic films, metal plates, glass, ceramics, wood, leather, etc., which are capable of receiving ink.

In addition, the term “ink” (also called “liquid”) refers to liquid applied to the recording medium for forming images, designs, patterns, etc., on the recording medium, processing the recording medium, or processing ink (for example, for solidifying or insolubilizing coloring material in the ink applied to the recording medium) and is to be interpreted broadly similar to the term “record (print)”.

In addition, the term “nozzle” refers broadly to discharge holes, liquid paths communicating with the discharge holes, and energy-generating elements used for discharging ink unless specified otherwise.

Overall Description

Figure 4:
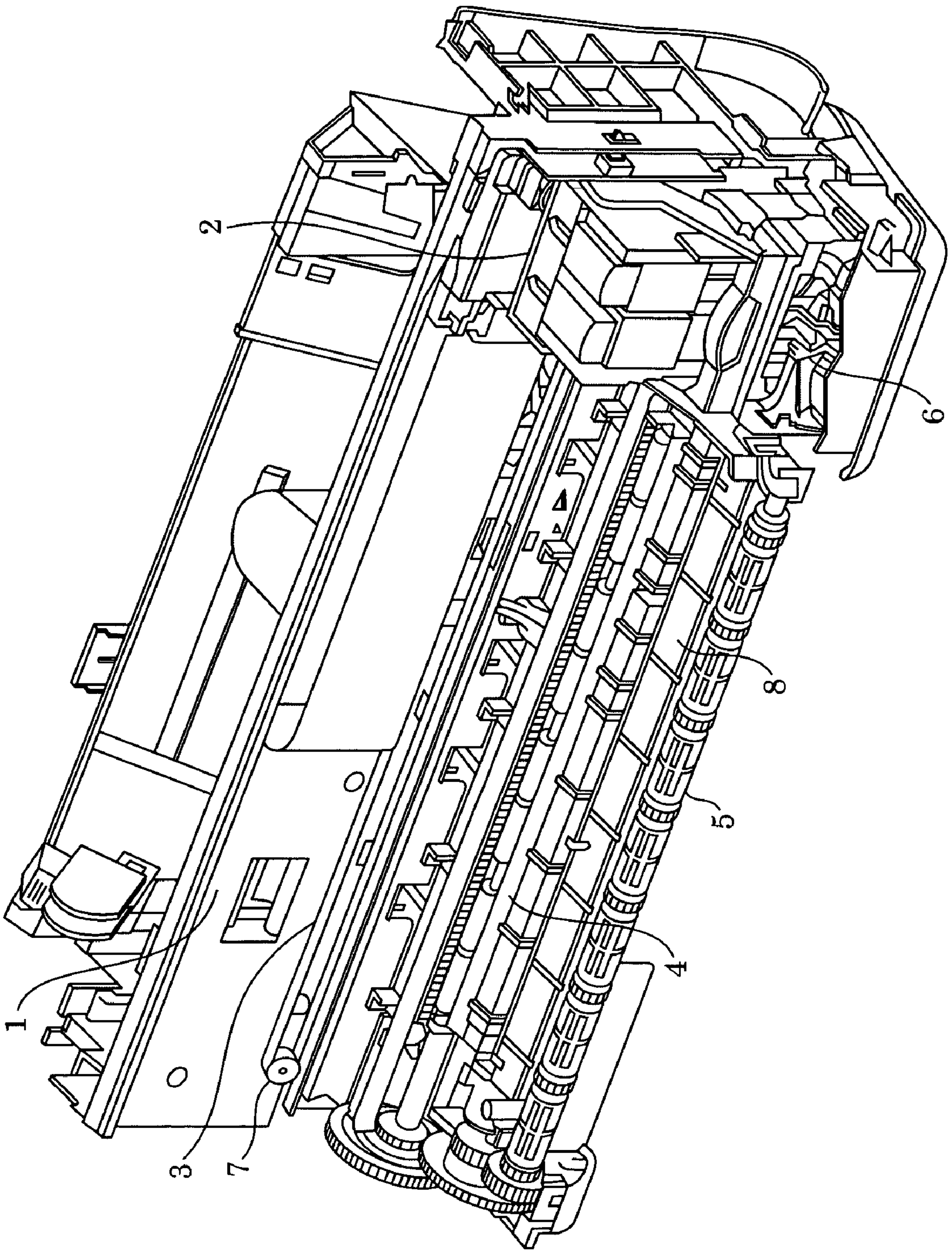
FIG. 4 is a perspective view showing the structure of an inkjet printer.

FIG. 4 is a perspective view showing the structure of a known printer. With reference to FIG. 4, a printer apparatus 1 is provided with functional components including a carriage 2, a timing belt 3, a conveyor roller 4, an output roller 5, a cleaning unit 6, a carriage motor 7, and a platen 8. The timing belt 3 is stretched around a pulley attached to a shaft of the carriage motor 7 and another pulley positioned at the opposite side. The carriage 2 is connected to a portion of the timing belt 3 and is moved by a driving force of the carriage motor 7 in the horizontal direction in the figure. The output roller 5 rotates slightly faster than the conveyor roller 4 so that a moderate tension is applied to a sheet of paper on the platen 8.

Figure 5:
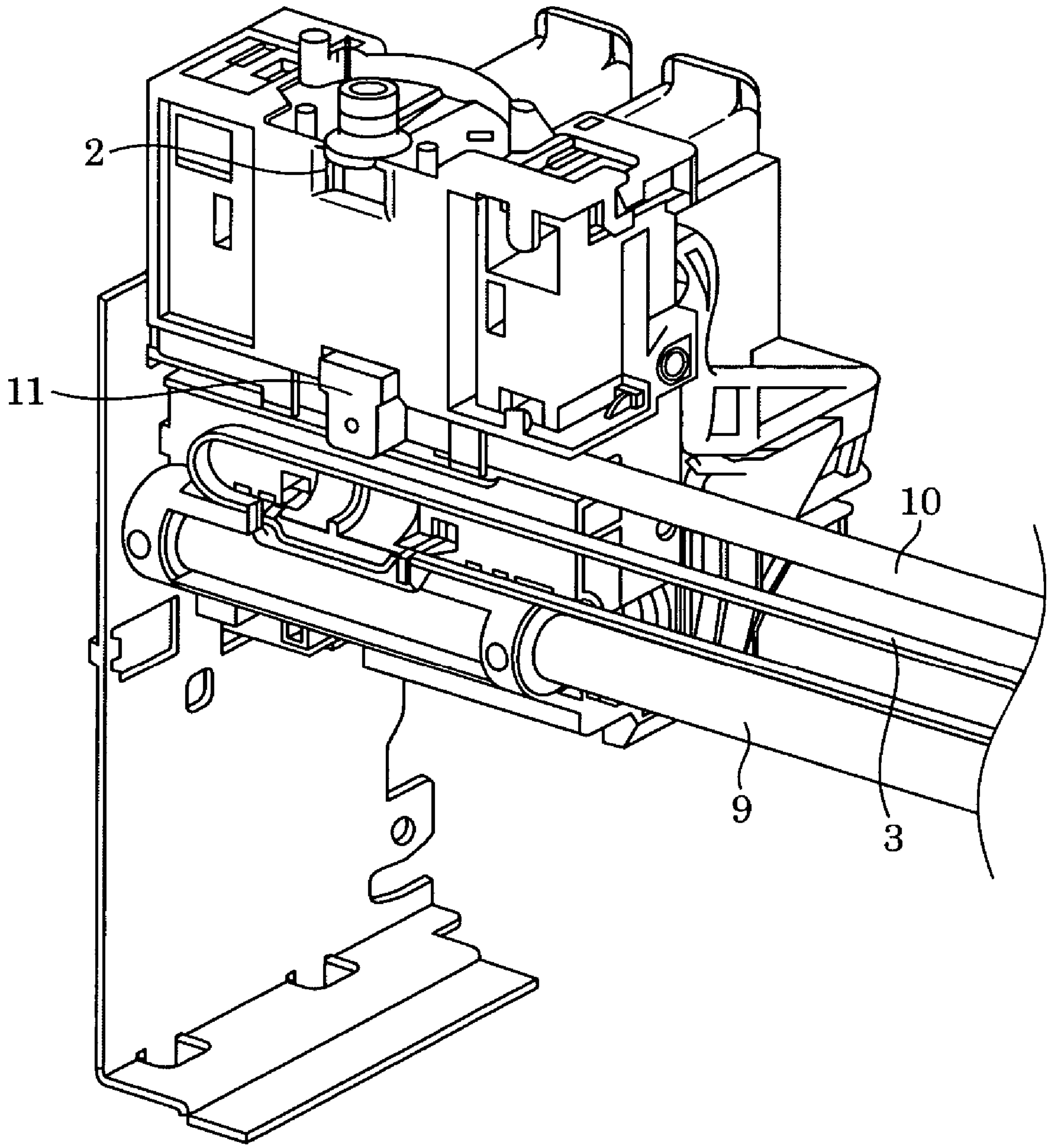
FIG. 5 is a rear view of a carriage.

FIG. 5 is a rear view of the carriage 2. In FIG. 5, the carriage 2 moves in the horizontal direction (main-scanning direction) while being supported on a shaft 9. In addition, the carriage 2 has an encoder 11 for reading a scaler 10 on the rear side thereof. The encoder 11 reads the scaler 10 provided along the printer apparatus 1 when the carriage 2 moves. The printer apparatus 1 constantly monitors the displacement of the carriage 2 and performs feedback control of the carriage motor 7 on the basis of the obtained information. In addition, the timing information for driving the print head is also generated on the basis of the position information obtained by the encoder 11.

Figure 6:
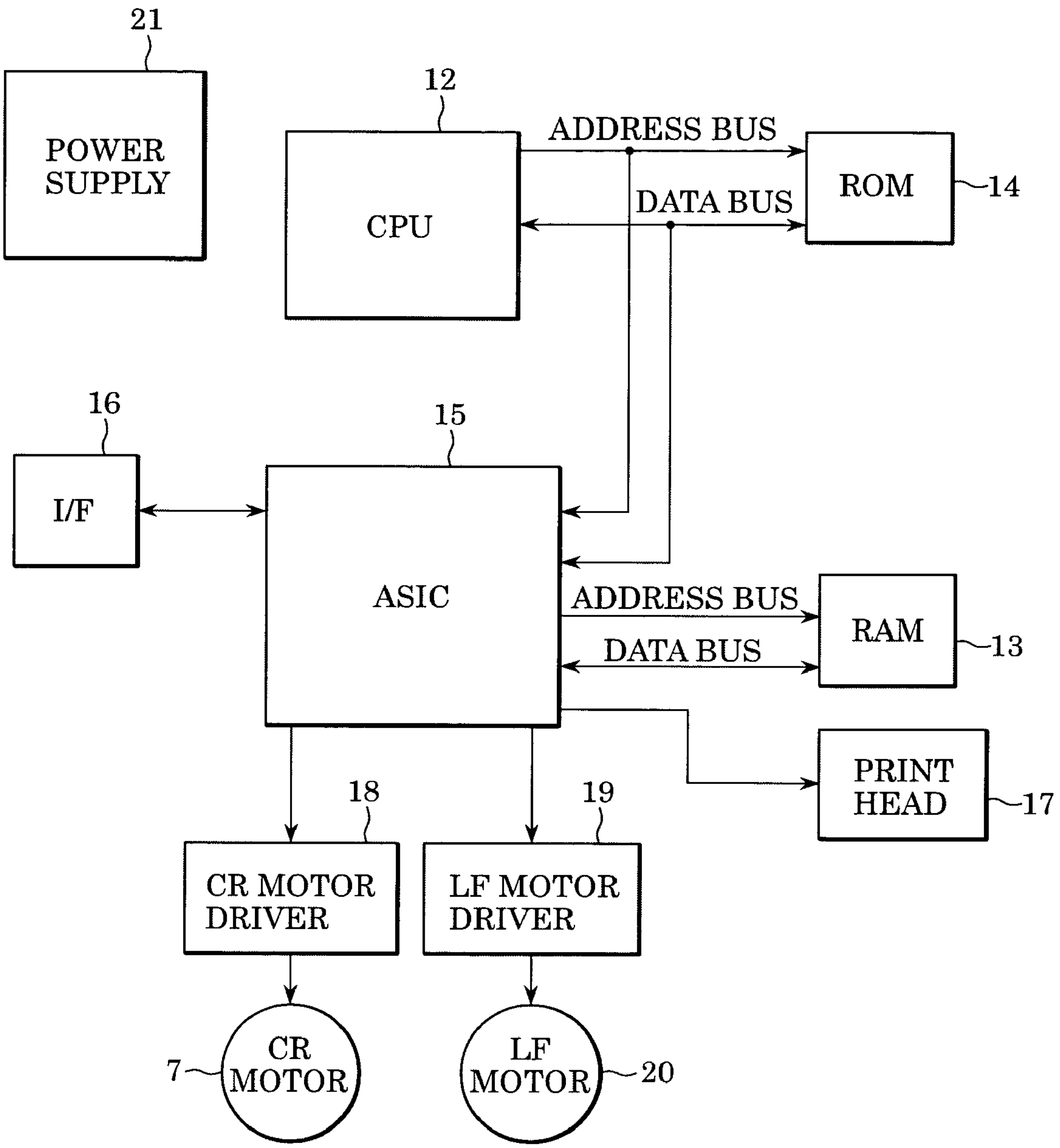
FIG. 6 is a block diagram showing an electrical circuit of a printer apparatus.

FIG. 6 is a block diagram showing the overall structure of an electrical circuit included in the printer apparatus. With reference to FIG. 6, the main components of the recording apparatus include a CPU 12, a RAM 13, a ROM 14, and an ASIC 15. Although each of the elements is shown as an individual component in FIG. 6, they may also be provided as a single LSI package in which all of the elements are integrated. The ROM 14 stores an OS, a firmware of the printer in a program area, drive tables for motors, etc. The ASIC 15 not only controls the driving of the motors but also performs image processing, communication with a host computer via an interface 16, ink discharge control of a print head (recording head) 17, etc. In addition, the RAM 13 functions as, for example, a receive buffer for temporarily storing data received from the host computer, a temporary memory (work area) used when the ASIC 15 performs image processing, and a scroll print buffer for storing the print data (recording data). The print buffer (recording buffer) stores data in the form of columns corresponding to nozzle lines of the print head. For example, data for a single column (first column data) is stored in the readout order, and then second column data, third column data, and so on, are successively stored in accordance with the main-scanning direction. Data corresponding to EVEN and ODD lines may, for example, be arranged in different areas.

Data tables for driving the motors are expanded in the work area. A carriage-moving motor driver (CR motor driver) 18 and a sheet-conveying motor driver (LF motor driver) 19 are provided for driving the carriage motor (CR motor) 7 and a sheet-conveying motor (LF motor) 20, respectively. The combination between the motor drivers and the motors shown in the figure is merely an example, and the number of motors and the number of motor drivers may differ depending on the printer apparatus. In addition, a power supply 21 functions as a logic power source for driving semiconductor devices, a motor-driving power source, and a head-driving power source for supplying power from commercial power source.

Next, a print-head control block unit for driving the print head will be described below. The print-head control block unit is included in the ASIC 15.

Figure 7:
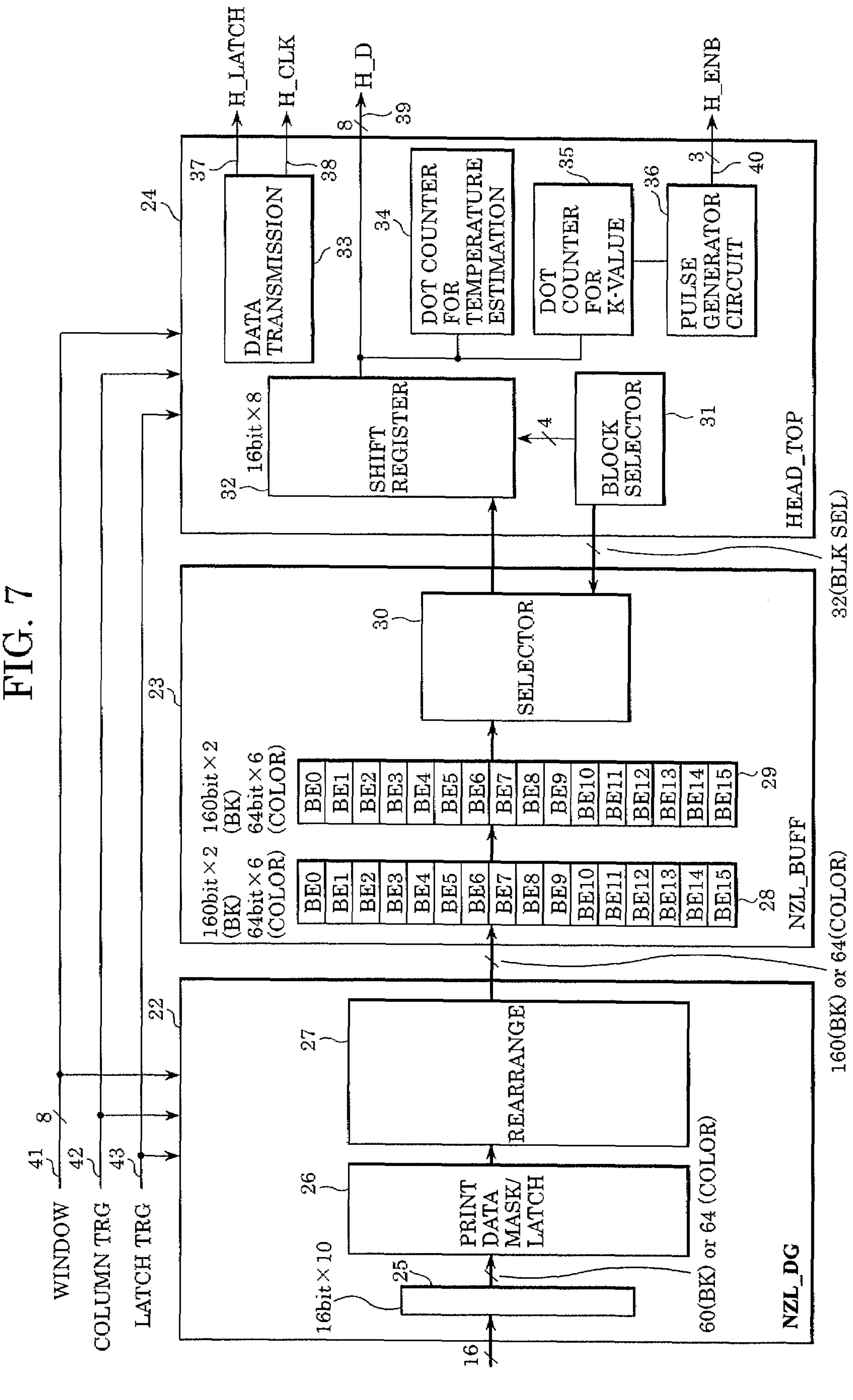
FIG. 7 is a block diagram showing the structure of a print-head control block unit.

FIG. 7 is a block diagram showing the structure of the print-head control block unit. As is clear from FIG. 7, the print-head control block unit includes three blocks: a nozzle-data generation block (NZL_DG) 22; a nozzle-data storage block (NZL_BUFF) 23; and a print-head control block (HEAD_TOP) 24.

Figure 2A:
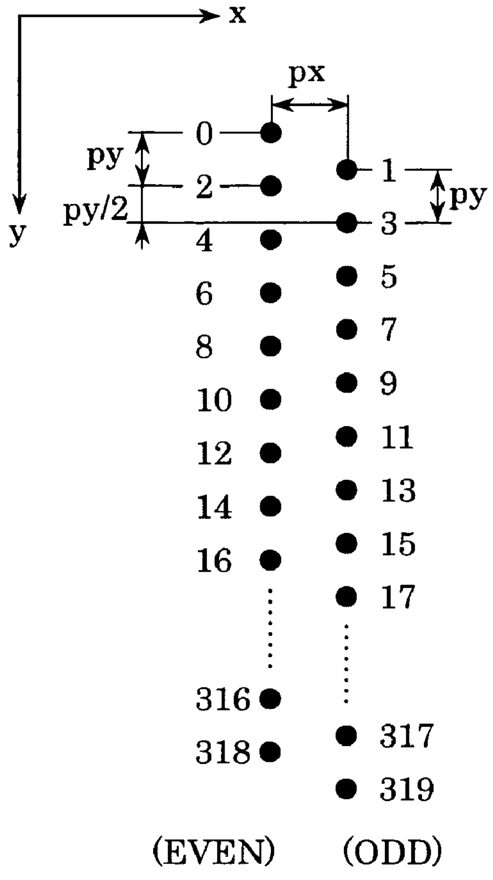
FIGS. 2A and 2B are diagrams showing nozzles arranged in a staggered pattern in a print head.
Figure 2B:
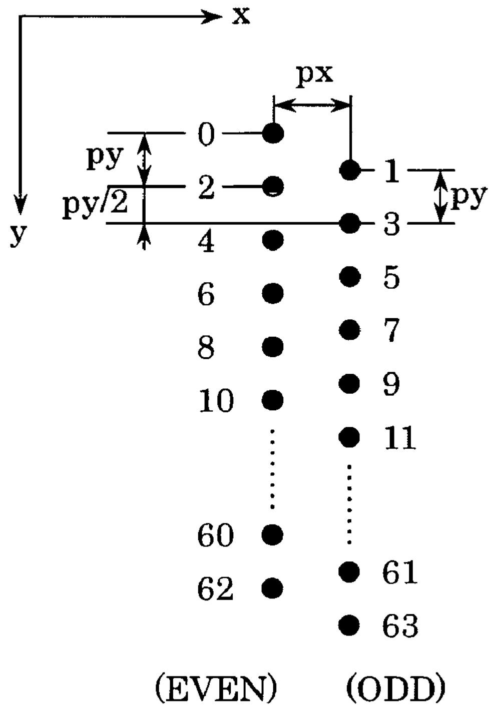

The nozzle-data generation block (NZL_DG) 22 includes a Direct Memory Access (DMA) transferor 25, a print data mask/latch 26, and a data rearranger 27. The DMA transferor 25 extracts the print data expanded in the RAM 13 by DMA transmission. In the example of print nozzle lines shown in FIGS. 2A and 2B, when all of the nozzles are used for printing, the extracted data is 16 (bits)×10 (number of DMA transmissions)=160 (bits) for each of the EVEN and ODD lines of the BK nozzles, and is 16 (bits)×4 (number of DMA transmissions)=64 (bits) for each of the EVEN and ODD lines of the COLOR nozzles for each color (for example, cyan). Thus, the number of DMA transmissions is determined on the basis of the number of nozzles being used.

The print data mask/latch 26 latches the data obtained by DMA transmissions and masks the nozzles which are not used on the basis of register information (not shown). At this time, each nozzle can be masked individually. The data rearranger 27 rearranges the data in accordance with the blocks of the print nozzles. More specifically, the print data is rearranged into nozzle data lines corresponding to each block in accordance with the nozzle information in the form of blocks shown in the tables of FIGS. 3A and 3B.

The nozzle-data storage block (NZL_BUFF) 23 functions as a buffer unit for storing the nozzle data having the block structure. The buffer unit consists of two buffers: a first buffer 28 and a second buffer 29. Each buffer has a structure for storing data for a single column of all of the colors, that is, a structure for storing data of all of the blocks. In addition, each buffer has as a structure including 160 bits×2 for the EVEN and ODD lines of the BK nozzles and 64 bits×6 for the EVEN and ODD lines of the COLOR nozzles of the three colors (cyan, magenta, yellow). The buffer unit includes two buffers for transmitting the block data of a certain column while preparing the data for the next column. The first buffer 28 and the second buffer 29 are used for writing and reading, respectively. A selector 30 successively selects blocks on the basis of a selection signal from a block selector 31 included in the print-head control block (HEAD_TOP) 24 and outputs the nozzle data for the selected block.

The print-head control block (HEAD_TOP) 24 includes the block selector 31, a shift register 32, a data-transmission-timing generator 33, a dot counter 34 for temperature estimation, a dot counter 35 for K-value, a pulse generator 36, and drive signals H_LACTH 37, H_CLK 38, H_D 39, and H_ENB 40 for the print head.

The block selector 31 outputs the block selection signal to the selector 30 in the nozzle-data storage block (NZL_BUFF) 23 in the order based on the time-division driving of the print head, and also outputs the block selection signal to the shift register 32. The shift register 32 converts the nozzle data output from the nozzle-data storage block (NZL_BUFF) 23 and the block selection signal into serial data, and outputs print-head drive data H_D 39. The print-head drive data H_D 39 has eight data lines corresponding to the EVEN and ODD lines of the BK nozzles and the COLOR nozzles of three colors.

The data-transmission-timing generator 33 generates the transmission clock H_CLK 38 for transmitting the print-head drive data H_D 39 to the print head and the latch signal H_LATCH 37 for latching the data in the shift register in the print head.

The dot counter 34 for temperature estimation and the dot counter 35 for K-value function as calculators for correcting the drive pulse width of the heat enable signal H_ENB 40 generated in the pulse generator 36 on the basis of the discharge frequency of the nozzles. The dot counter 34 for temperature estimation is used for changing a correction table at an interval of several tens of milliseconds. The dot counter 35 for K-value corrects the optimum pulse width for the next block on the basis of the discharge frequency of the nozzles in the previous block. The heat enable signal H_ENB 40 has a single line for the BK nozzles and two lines for the COLOR nozzles. The reason why two lines are provided for the COLOR nozzles is to distribute the energy required for discharge by shifting the heating timing.

The reference timing for driving the above-described print-head control block (HEAD_TOP) 24 is obtained by Window 41, Column TRG 42, and Latch TRG 43 output from a print timing generator on the basis of encoder signals (not shown). The flag of Window 41 is set (Window Open) when the carriage moves in the raster direction and reaches the printing position, and is canceled (Window Close) when the printing is finished. Window 41 has eight lines corresponding to the EVEN and ODD lines of the BK nozzles and the COLOR nozzles of three colors.

Column TRG 42 is a trigger signal output at the column interval. The print resolution in the raster direction (that is, the main-scanning direction and the moving direction of the carriage) is defined by the interval of the column trigger. Latch TRG 43 is generated at an interval corresponding to that obtained by dividing the column interval by the number of blocks. When 16 blocks are provided as in the present embodiment, 16 pulses of Latch TRG 43 are generated in the time corresponding to a single column.

Figure 8:
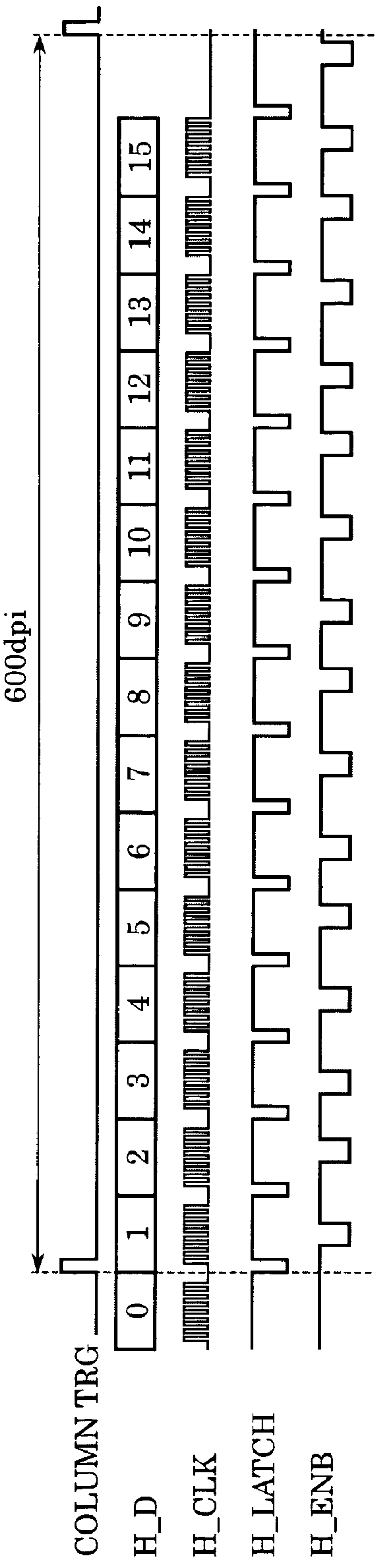
FIG. 8 is a timing chart for driving a single column of a print head when the resolution is 600 dpi.

FIG. 8 is a diagram showing the drive timing of the print head for a single column when the resolution is 600 dpi. In FIG. 8, Column TRG 42 is an internal signal, and H_LACTH 37, H_CLK 38, H_D 39, and H_ENB 40 are drive signals of the print head. As shown in the figure, a single column including 16 blocks is subjected to time-division driving. H_D 39 is transmitted to the shift register in the print head by H_CLK 38, and is latched at the falling edges of H_LACTH 37. The latched drive data is output in the next block by the heat pulse H_ENB 40, and the next drive data is transmitted. Although the time interval of Column TRG 42 varies depending on the print speed of the carriage 2, the distance by which the carriage 2 moves for a single column is 1/600 inches.

Figure 9:
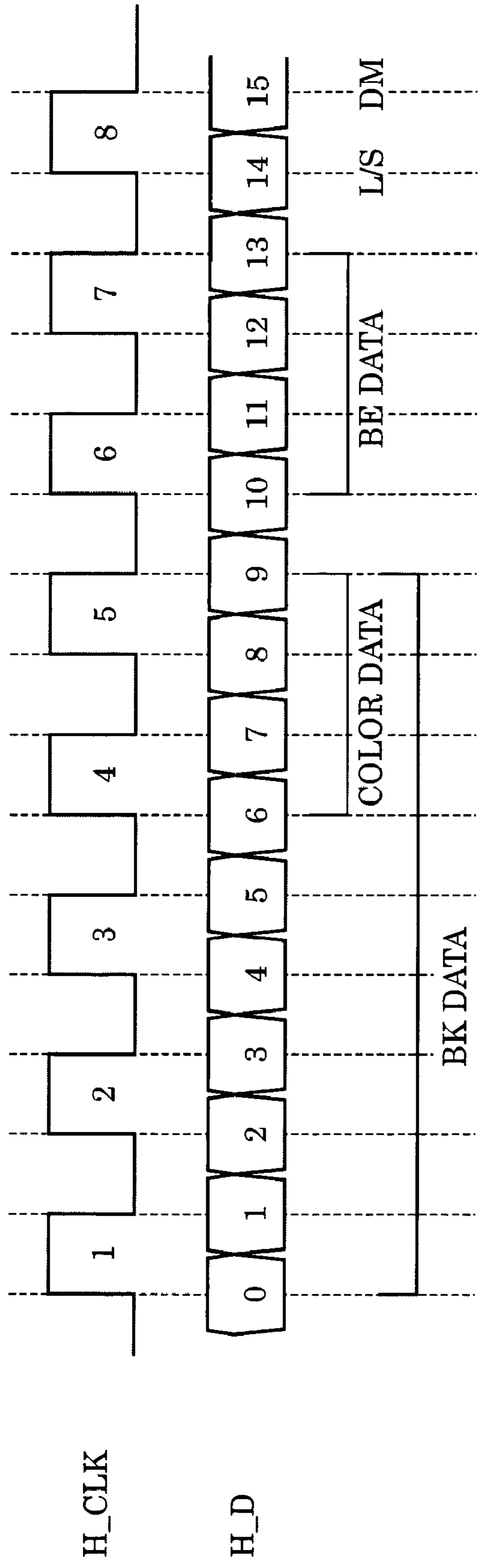
FIG. 9 is a diagram showing the relationship between a transmission clock (H_CLK) and print-head drive data (H_D).

FIG. 9 is a diagram showing the relationship between the transmission clock H_CLK 38 and the print-head drive data H_D 39. In order to reduce the transmission time, the print-head drive data H_D 39 is obtained at both the rising and falling edges of H_CLK 38. The frequency of H_CLK 38 is 6 MHz. With regard to the data structure of H_D 39, bits 0 to 9 represent nozzle data, which is 10-bit data for the black (BK) nozzles and 4-bit data (bits 6 to 9) for the COLOR nozzles of each color. The next 4 bits (bits 10 to 13) represent block selection data, based on which the block to be driven is selected. Bit 14 represents data for switching the heater, and bit 15 represents data for selecting a dummy nozzle. However, these data are irrespective of the contents of the present embodiment, and detailed explanations thereof are thus omitted.

Figure 10:
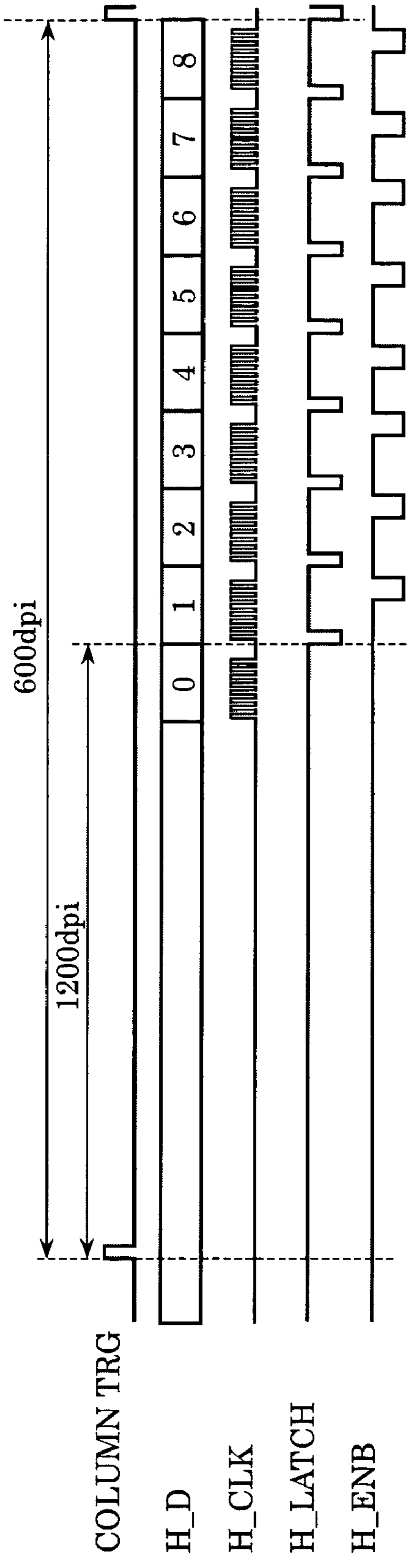
FIG. 10 is a timing chart of the print head corresponding to FIG. 8, showing the case in which half-pixel shift is performed.

FIG. 10 shows the state in which the registration adjustment is performed with a half-pixel shift from the timing shown in FIG. 8. When the half-pixel time shift is performed as shown in FIG. 10, the print-head drive data H_D 39 and the heat enable pulse H_ENB 40 start at the time corresponding to 1200 dpi, which is one-half of the column interval 600 dpi. Thus, the half-pixel shift is realized by starting the print head driving at a position shifted by a distance corresponding to 0.5 pixels relative to the print resolution.

Figure 11:
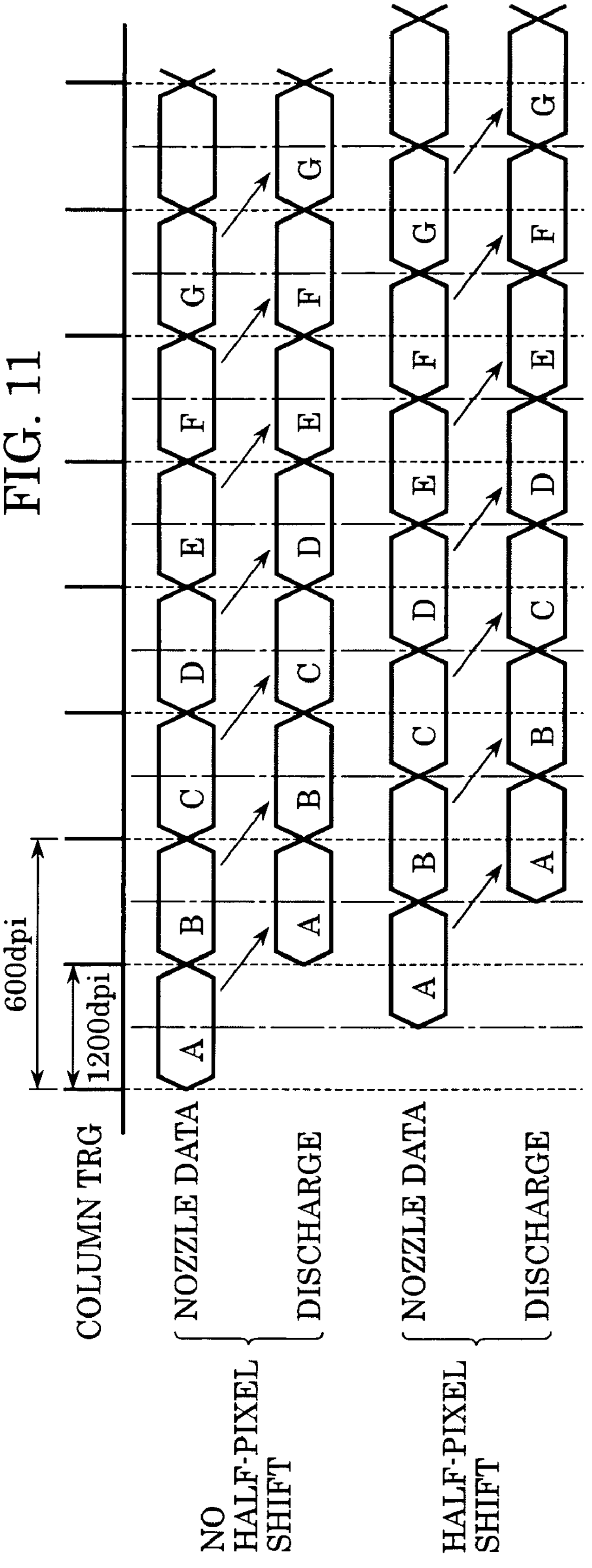
FIG. 11 is a diagram showing the relationship between a nozzle-data generation timing and a discharge timing according to a known structure.

FIG. 11 shows the timing at which the nozzle-data generation block (NZL_DG) 22 reads out the nozzle data from the print buffer in the RAM 13 and latches the nozzle data in the first buffer 28 of the nozzle-data storage block (NZL_BUFF) 23 and the timing at which the nozzle data in the second buffer 29 is transmitted to the print-head control block (HEAD_TOP) 24 for the discharge under the above-described print conditions. The upper half of the figure corresponds to the case in which the half-pixel shift is not performed and the lower half of the figure corresponds to the case in which the half-pixel shift is performed.

When the half-pixel shift is not performed, the nozzle data is updated at the period of the Column TRG 42. In addition, although the discharge from the print head is also performed at the period of the Column TRG 42, the discharge timing is delayed by the time corresponding to a single column since the latched nozzle data is used. When the half-pixel shift is performed, the nozzle data is extracted in the time corresponding to a single column starting at the timing delayed by the time corresponding to 0.5 pixels, and the discharge is started at the timing delayed by the time corresponding to a single column and 0.5 pixels.

Characterizing Part of Present Embodiment

The characterizing part of the present embodiment will be described below on the basis of the above-described overall structure.

FIG. 1 is a diagram which most clearly shows a print-head driving method according to the present embodiment. FIG. 1 shows the timing at which the nozzle-data generation block (NZL_DG) 22 generates the nozzle data and latches the nozzle data in the first buffer 28 of the nozzle-data storage block (NZL_BUFF) 23 and the timing at which the nozzle data in the second buffer 29 is transmitted to the print-head control block (HEAD_TOP) 24 for the discharge. The resolution of the print data expanded in the print buffer is 600 dpi.

In the print-head driving method according to the present embodiment, the nozzle-data generation block (NZL_DG) 22 reads out the image data stored in the print buffer at the period corresponding to two columns. As shown in FIG. 1, the discharge timing corresponds to the resolution of 1200 dpi, irrespective of whether the half-shift is performed, whereas the nozzle data (recording data) is read out at the timing corresponding to the resolution of 600 dpi. For example, if the data of a first column is read out in a time period corresponding to the resolution of 1200 dpi, no data is read out in the next time period, and then the data of the second column is read out in the next time period. Accordingly, although the column interval is 1200 dpi, the time interval at which the nozzle-data generation block (NZL_DG) 22 updates the nozzle data is 600 dpi, which is the same as the resolution of the image in the print buffer.

The setting for reading out the image data at the period corresponding to two columns is performed by a register provided in the nozzle-data generation block (NZL_DG) 22.

The function of the register is shown in FIG. 12. Bits 0 to 3 (both writing and reading are possible for each bit) are set in correspondence with the colors so that the DOUBLE mode (reading at the period of two columns) can be set for each color individually, as shown in the figure. In the case in which the half-pixel shift is set, generation of the nozzle data is started at the timing delayed by a time corresponding to 0.5 pixels (1200 dpi), as shown in FIG. 1.

The print-head control block (HEAD_TOP) 24 has a function of selecting whether to drive the print head on the basis of the data corresponding to a single column in the front half (period) or the last half (period) in the time corresponding to the column. The selection is performed by a register provided in the print-head control block (HEAD_TOP) 24. Accordingly, selection between a front-half column driving (front-half driving) and a last-half column driving (last-half driving) is performed. Thus, the registration adjustment is performed by combining the results of the above-described selection and the selection of whether or not to perform the half-pixel shift.

For example, with reference to FIG. 1, the black nozzle lines may be driven at the timing corresponding to the combination of no half-pixel shift and front-half driving while the cyan nozzles lines are driven at the timing corresponding to the combination of no half-pixel shift and last-half driving, the magenta nozzle lines at the timing corresponding to the combination of half-pixel shift and front-half driving, and the yellow nozzle lines at the timing corresponding to the combination of half-pixel shift and last-half driving.

The structure of the register is shown in FIG. 13. In FIG. 13, bit 6 is a switch for enabling/disabling the present function, and bits 0 to 5 are used for selecting from between the front-half driving and the last-half driving for the EVEN and ODD lines of each color. According to the setting, the discharge is performed in the 1200-dpi driving range in the front half or that in the last half, as shown in FIG. 1. This setting is provided for the EVEN and ODD lines of each color.

When the half-pixel shift is set, the discharge timing is delayed by the time corresponding to 0.5 pixels (1200 dpi) compared to the case in which the half-pixel shift is not set. Accordingly, the discharge position can be shifted, that is, the registration adjustment can be performed, by 2400 dpi at a maximum by combining the function described above and the half-pixel shift.

Figure 14:
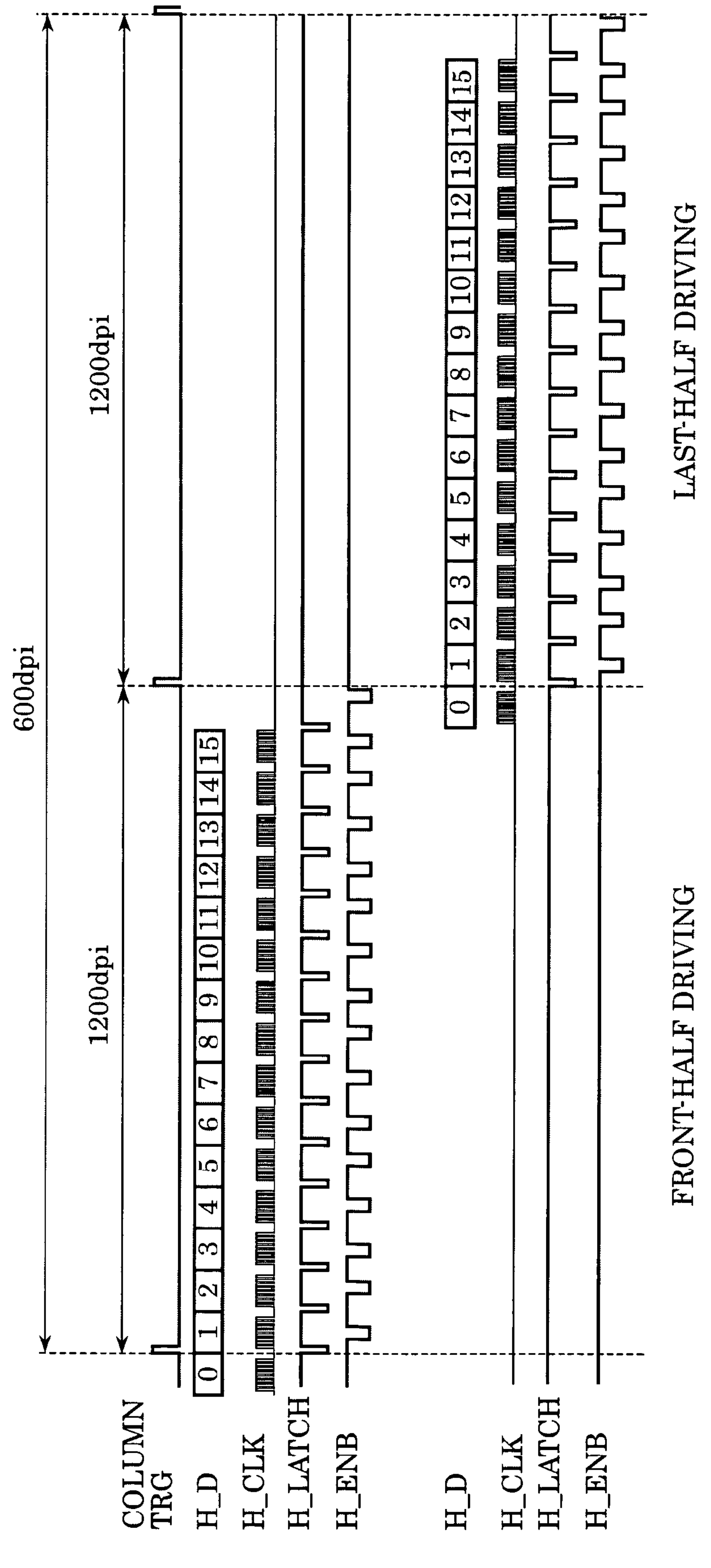
FIG. 14 is a diagram showing the relationship between a nozzle-data generation timing and a discharge timing according to the embodiment of the present invention.
Figure 15:
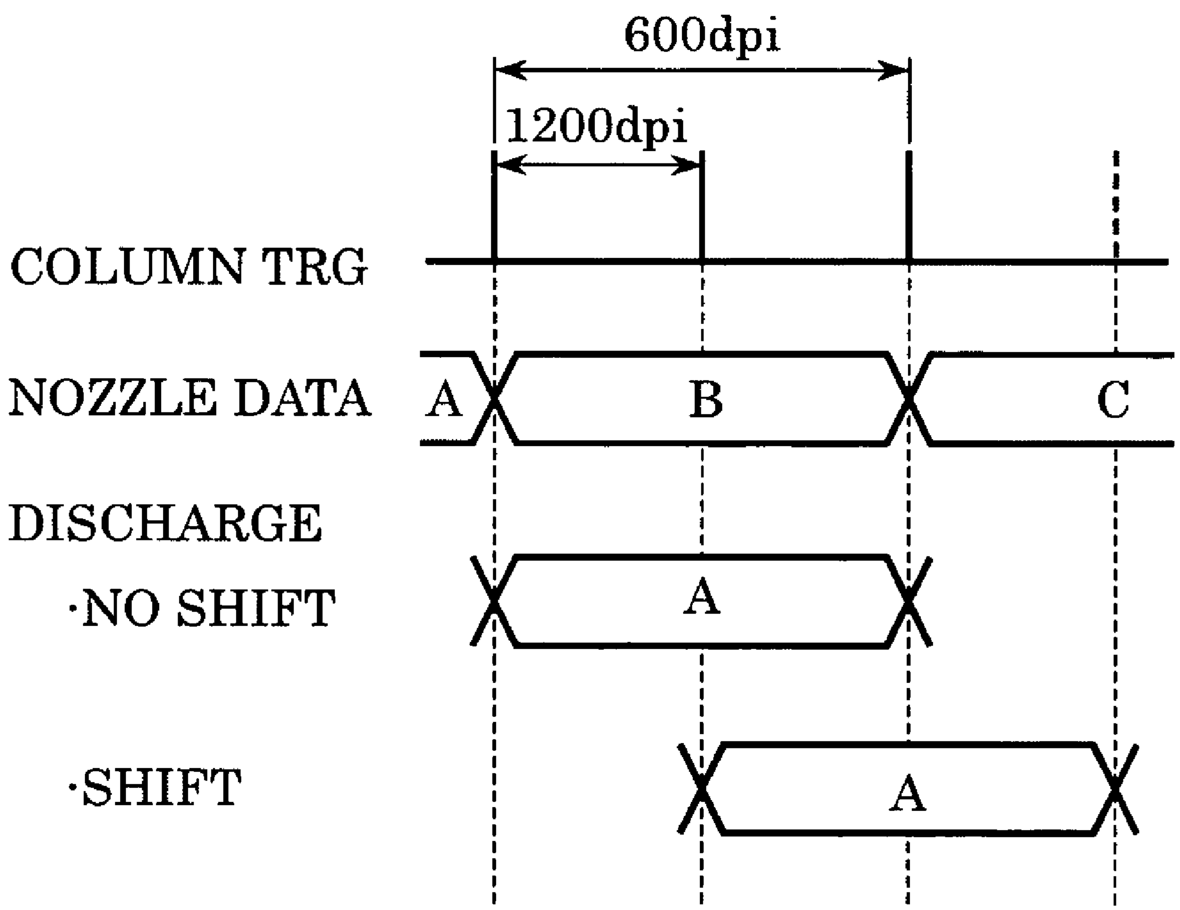
FIG. 15 is a diagram showing that the amount of shift can be set in units of 600 dpi when the print resolution is 600 dpi in the moving direction of a recording head.

FIG. 14 shows the timing of the print-head drive data based on the print-head driving method according to the present embodiment. FIG. 14 corresponds to a nozzle line selected from the EVEN and ODD nozzle lines of each color. As shown in the figure, two columns are considered as a single driving unit, and the discharge is performed in the front-half period or the last-half period in this driving unit depending on the value set in the setting register 13 of the print-head control block (HEAD_TOP) 24 as described above.

According to the present embodiment, when the front-half drive timing or the last-half drive timing is set for all of the EVEN and ODD nozzle lines of all of the colors, H_LACTH 37, H_CLK 38, H_D 39, and H_ENB 40 are output in only one of the two columns. However, since these signals are common to the print head, they are output in both of the front-half and last-half periods as long as there is at least one nozzle line whose setting is different from the others.

The size of black (BK) dots are four to five times larger than those of color dots, and they cannot be discharged at the interval of 1200 dpi. However, when the print data for black is 300 dpi or less, the print control according to the present embodiment can be applied and its effects can be provided.

Accordingly, the discharge from the print head can be performed at the time interval corresponding to a resolution twice as high as that of the image data. More specifically, the discharge can be performed in a time which is one-half of the time corresponding to the resolution. When the resolution of the data in the print buffer is 600 dpi, as in the above-described example, the print head can be driven at the time interval of 1200 dpi, and the time for the time-division driving of all of the blocks is reduced. Therefore, even when the resolution of the print data is low, the time required for the time-division driving can be reduce to one-half of that in the known print-head driving method. In addition, the displacements of dots between the blocks in each column in the time-division driving can be reduced.

In addition, the discharge timing can be selected between the 1200 dpi in the front half of the column or that in the last half of the column, and the resolution of the registration adjustment is doubled compared to that in the known print-head driving method. In the case in which the resolution is 600 dpi, as described above, the print data can be shifted at the resolution of 1200 dpi. In addition, when the half-pixel shift is used in combination, a shift of 2400 dpi is possible and the resolution of the registration adjustment (color shift correction) between the nozzle lines is increased.

As described above, in the present embodiment, even when the resolution of the print data is low, the time required for the time-division driving of the print head is reduced to one-half of that in the known print-head driving method. In addition, the displacements of dots between the blocks in each column due to the time-division driving are reduced and the resolution of registration adjustment is increased.

The present invention is applicable not only to inkjet printers but also to facsimile machines, copy machines, word processors, complex machines, etc., in which the inkjet printers are applied.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-410768 filed Dec. 9, 2003, which is hereby incorporated by reference herein.

What is claimed is:

1. An inkjet recording method for moving a recording head to perform recording at a first resolution in a moving direction of the recording head, the recording head having a plurality of nozzle lines on each of which a plurality of discharge nozzles are arranged, the method comprising:

a storing step of storing recording data in a recording buffer;

a readout step of reading out the recording data from the recording buffer at a period corresponding to a second resolution;

a readout-timing selecting step of selecting whether or not to delay a timing at which the readout step is performed by an interval corresponding to one-half of the period corresponding to the first resolution; and a drive-timing selecting step of selecting whether to drive the inkjet head in at least one of a front half and a last half of the period corresponding to the first resolution.

2. An inkjet recording apparatus having a movable recording head configured to perform recording at a first resolution in a moving direction of the recording head, the recording head having a plurality of nozzle lines on each of which a plurality of discharge nozzles are arranged, the apparatus comprising:

a recording buffer storing recording data;

a readout unit configured to read out the recording data from the recording buffer at a period corresponding to a second resolution;

a readout-timing selecting unit configured to select whether or not to delay, a timing at which the readout unit reads out, by an interval corresponding to one-half of the period corresponding to the first resolution;

a drive-timing selecting unit configured to select whether to drive the inkjet head in at least one of a front half and a last half of the period corresponding to the first resolution; and a setting unit configured to set the readout-timing selecting unit and the drive-timing selecting unit for each of the nozzles.

3. The inkjet recording apparatus according to claim 2, wherein each of the nozzle lines in the recording head is divided into a plurality of groups which are subjected to time-division driving.

4. The inkjet recording apparatus according to claim 2, wherein the first resolution is twice as high as the second resolution.

5. An inkjet recording apparatus including a recording head having a plurality of nozzle lines on each of which a plurality of discharge nozzles are arranged, the apparatus comprising:

a moving unit operable to move the recording head;

a recording buffer storing recording data;

a readout unit configured to read out the recording data from the recording buffer based on a readout timing to correct a recording start position, the readout timing corresponding to a predetermined recording resolution; and a driving unit configured to drive the recording head based on a drive timing to correct a variation in discharge positions, the drive timing corresponding to the predetermined recording resolution, wherein the driving unit drives the recording head to output the recording data read out by the readout unit, and performs recording at the predetermined recording resolution in a direction in which the moving unit moves the recording head, and wherein a period of the readout timing corresponds to one-half of a period corresponding to the predetermined recording resolution.

6. An inkjet recording apparatus including a recording head having a plurality of nozzle lines on each of which a plurality of discharge nozzles are arranged, the apparatus comprising:

a moving unit operable to move the recording head;

a recording buffer storing recording data;

a readout unit configured to read out the recording data from the recording buffer based on a readout timing to correct a recording start position, the readout timing corresponding to a predetermined recording resolution; and a driving unit configured to drive the recording head based on a drive timing to correct a variation in discharge positions, the drive timing corresponding to the predetermined recording resolution, wherein the driving unit drives the recording head to output the recording data read out by the readout unit, and performs recording at the predetermined recording resolution in a direction in which the moving unit moves the recording head, and wherein a period of the drive timing corresponds to at least one of a front half and a last half of a period corresponding to one-half of a period corresponding to the predetermined recording resolution.

* * * * *